(12) United States Patent
Reasor et al.

(10) Patent No.: US 7,100,031 B1
(45) Date of Patent: Aug. 29, 2006

(54) DETECTOR AND OPERATIONAL METHOD FOR A FIRMWARE INTERFACE

(75) Inventors: Jason W. Reasor, Frisco, TX (US); Kenneth J. Geer, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 625 days.

(21) Appl. No.: 10/107,608

(22) Filed: Mar. 27, 2002

(51) Int. Cl.
*G06F 15/177* (2006.01)
(52) U.S. Cl. ............................. 713/1; 710/8; 719/327
(58) Field of Classification Search ................ 713/1, 713/2
See application file for complete search history.

(56) References Cited

U.S. PATENT DOCUMENTS

| | | | | |
|---|---|---|---|---|
| 6,304,885 B1 * | 10/2001 | Savage et al. | ............... | 715/500 |
| 6,771,526 B1 * | 8/2004 | LaBerge | ...................... | 365/63 |
| 6,816,963 B1 * | 11/2004 | Krithivas et al. | ............... | 713/1 |
| 6,832,354 B1 * | 12/2004 | Kawano et al. | ............... | 715/771 |
| 6,839,856 B1 * | 1/2005 | Fromm et al. | ............... | 713/400 |

OTHER PUBLICATIONS

Mark Doran, Extensible Firmware Interface, Changing the Face of BIOS, Intel Developer Forum for Fall 2001, Aug. 28-30, 2001.
Harry Hsiung, EFI 1.1 Driver Model Demonstration, EFI TME Performance Tools Operation Intel Corporation, Intel Developer Forum for Fall 2001, Aug. 27-30, 2001.
Intel Product Release Notes, [online], [retrieved on Feb. 26, 2002]. Retrieved from the Internet http://msdn.microsoft.com/vstudio/sp/vs6sp4/default.asp. Date Unknown.

* cited by examiner

*Primary Examiner*—Lynne H. Browne
*Assistant Examiner*—Anand B. Patel

(57) ABSTRACT

A detector detects information about a firmware system. The detector includes an interface that receives a generic instruction. The generic instruction may be a function call made through an EFI shell. The detector has a controller communicatively connected to the interface. The controller receives the generic instruction and gathers information about the firmware system. Gathering information about the firmware system permits platform-specific firmware system functions to be written to the firmware system. The controller gathers information about the firmware system by accessing a data-gathering function based on the generic instruction. The controller retrieves the information through the data-gathering function and transfers the information to the interface.

19 Claims, 6 Drawing Sheets

DETECTOR AND OPERATIONAL METHOD FOR A FIRMWARE INTERFACE

BACKGROUND OF THE INVENTION

Microprocessors can operate to control a myriad of hardware devices; an example of one such hardware device is an input/output (I/O) controller. For a microprocessor to properly control a hardware device, the microprocessor is directed by a series of instructions known as software. Software instructions exist on a variety of levels relative to the microprocessor. Software instructions that exist to directly control the microprocessor at a very basic level are typically known as firmware. When operational, the firmware and the microprocessor behave as a firmware system.

A basic input/output system (BIOS) developed by Phoenix Technologies Ltd. is an example of firmware. Typically, the BIOS operatively controls microprocessors having an "x86" architecture. Microprocessors having an "x86" architecture are similar to many microprocessors from Intel Corporation and Advanced Micro Devices, Incorporated (AMD). The BIOS is typically stored in a read only memory (ROM) and directs a microprocessor to test hardware devices when started. The BIOS also loads and starts an operating system, such as DOS or Windows, both produced by Microsoft Corporation. The BIOS also supports data transfers among hardware devices. The BIOS is fairly transparent to a user of the operating system.

Until recently, a BIOS would serve to load and start an operating system of a computer. However, advancements in software engineering have led to the development of a firmware interface known as an Extensible Firmware Interface (EFI), developed by Intel Corporation. The EFI includes a layer of software that resides between a firmware system and the operating system. The EFI offers a higher-level set of software controllers, known as drivers, as components to the firmware system. The controllers direct functions of the firmware system and in turn direct various hardware devices through a higher-level programming language, such as the "C" programming language. A benefit to the EFI includes decoupling the operating system from the firmware system, which makes the operating system substantially independent of the firmware system. Moreover, an interface between the firmware system and the operating system is easier to maintain since the EFI is typically written in the higher level programming language than the firmware, which may be written in an assembly programming language.

An EFI includes an application programming interface (API) having a command line interface known as a shell. The EFI may include a collection of boot services, runtime services, loaded drivers, and loaded protocols. The EFI shell is similar to other command line interfaces. An example of another command line interface is a DOS shell developed by Microsoft Corporation. While the DOS shell allows a user to access functions of the operating system, the EFI shell allows a user to access functions of a single firmware system. Accessing functions of the firmware system is performed through information gathering functions that obtain information relative to the firmware system. Since the EFI shell interacts with a single firmware system, the information gathering functions of the EFI shell serve to gain access to that particular firmware system. An illustration of the EFI can be seen in FIG. 1.

FIG. 1 shows a prior art software architecture including an EFI 102 for computing system 100. EFI 102 is communicatively connected to operating system 104. EFI 102 is also communicatively connected to firmware system 112. Firmware system 112 includes firmware instruction set 114 that is typically stored in a read only memory device. Firmware system 112 also includes hardware 116, which typically includes a microprocessor that accesses the read only memory device to process firmware instruction set 114.

EFI 102 includes EFI operating system loader 106, which serves to load and start operating system 104. EFI 102 also includes a variety of service functions in EFI boot service 108; the service functions include runtime services 105, boot devices 107, EFI drivers 109, and protocol handlers 111. These service functions, 105, 107, 109, and 111, start, commonly referred to as "booting" and "handshaking", associated hardware devices when computer system 100 is initialized. EFI 102 also includes EFI shell 110, which allows a user to interact with firmware system 112 through the variety of functions stored in EFI boot service 108.

Firmware developers often develop and implement software tools through EFI shell 110. These software tools are occasionally necessary to direct the microprocessor to perform a new desired function. However, present information gathering functions of the EFI shell are developed for a single firmware system, such as firmware system 112. The information gathering functions are incapable of interacting with other firmware systems.

Many manufacturers of computer systems purchase microprocessors and develop firmware to suit their particular needs. Some manufactures even develop multiple firmware systems for different products. EFI 102 and EFI shell 110 are not portable to multiple firmware platforms. Accordingly, the prior art requires matching between the particular firmware system 112 and EFI 102, which complicates the design of information gathering functions.

The invention provides certain features to advance the state of the art by providing, among other features, a detector for detecting information about a firmware system. Other features will be apparent in the description that follows.

SUMMARY OF THE INVENTION

In one aspect, the invention provides a detector for detecting information about a firmware system. The detector includes an interface that receives a generic instruction. The generic instruction can be a function call that is made through an EFI Boot Manager. The EFI Boot Manager may include an EFI shell in which the generic instruction can be made. The detector also has a controller that is communicatively connected to the interface. The controller receives the generic instruction and begins to gather information about the firmware system. Gathering information about the firmware system allows for platform-specific firmware system functions to be written to the firmware system. The controller gathers information about the firmware system by accessing a data-gathering function based on the generic instruction. The controller then retrieves the information through the data-gathering function. Afterwards, the controller transfers the information to the interface. In one aspect, the controller transfers the information to the EFI Boot Manager through the interface via the generic instruction. The detector may, thus, operate as an abstracted data gathering system of the EFI.

In another aspect, the detector is implemented through software instructions that direct a microprocessor of the firmware system to act in accordance with the invention. In a software implementation of the detector, the controller is configured to operate in response to an initialization of the firmware system. Functions of the controller are pre-compiled to run when the firmware system is started. Functions that perform a retrieval of information relative to the firmware system depend on a type of firmware system. For example, a retrieval of information relative to one type of firmware system may be implemented through tree function calls based on the type of firmware system; a retrieval of information relative to another type of firmware system may be performed through an Extended System Abstraction Layer Interface (ESI) based on the other type of firmware system. The ESI may be extended procedures of the System Abstraction Layer (SAL). However, the generic instruction, or generic instruction set, is independent of the firmware system type.

In yet another aspect, the firmware system can include Itanium family microprocessors from Intel Corporation. The firmware system can also include, either optionally or in combination, an IA-32 microprocessor from Intel Corporation.

BRIEF DESCRIPTION OF THE DRAWINGS

A more complete understanding of the invention may be obtained by reference to the drawings, in which.

DETAILED DESCRIPTION OF THE DRAWINGS

Figure 1:
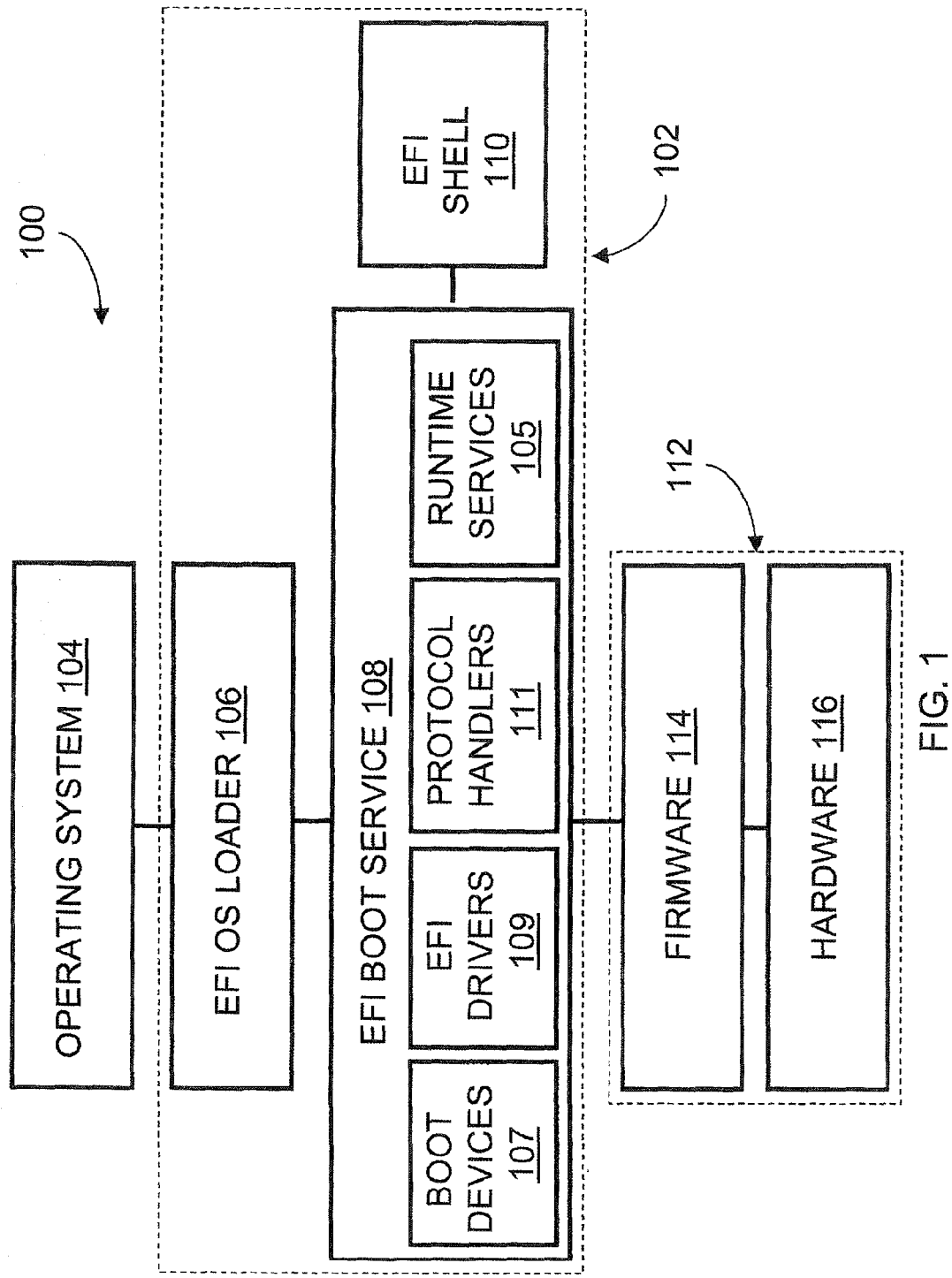
FIG. 1 shows a prior art software architecture including an EFI for a computing system.
Figure 2:
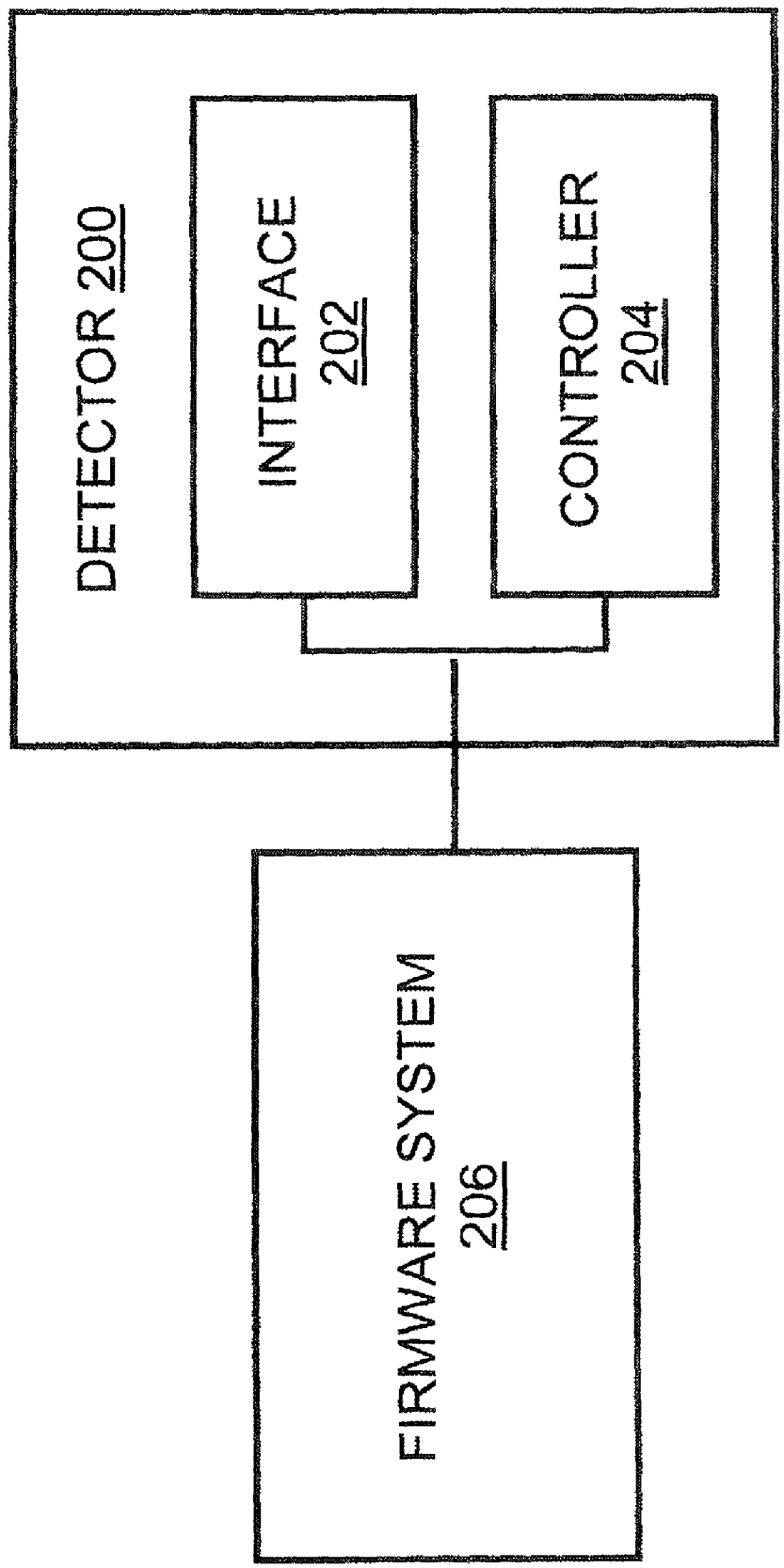
FIG. 2 shows one detector interfacing with a firmware system, in accord with one embodiment of the invention.

FIG. 2 shows detector 200 interfacing with firmware system 206, in accord with one embodiment of the invention. Detector 200 is communicatively connected to firmware system 206 to detect information about firmware system 206. Detector 200 includes interface 202 and controller 204, communicatively connected to one another. The information typically captured with respect to firmware system 206 by detector 200 can include processor types and a number of processors. Those skilled in the art should appreciate that other information may be gathered including firmware system types.

Interface 202 is configured to receive a generic instruction. The generic instruction may, for example, include a function and/or a flag that initiates another function. Controller 204 is configured to gather information about firmware system 206 by accessing a data-gathering function based on the generic instruction. Controller 204 retrieves information about firmware system 206 through the data-gathering function, and transfers the information to interface 202. Operation of detector 200 is shown in FIG. 3.

Figure 3:
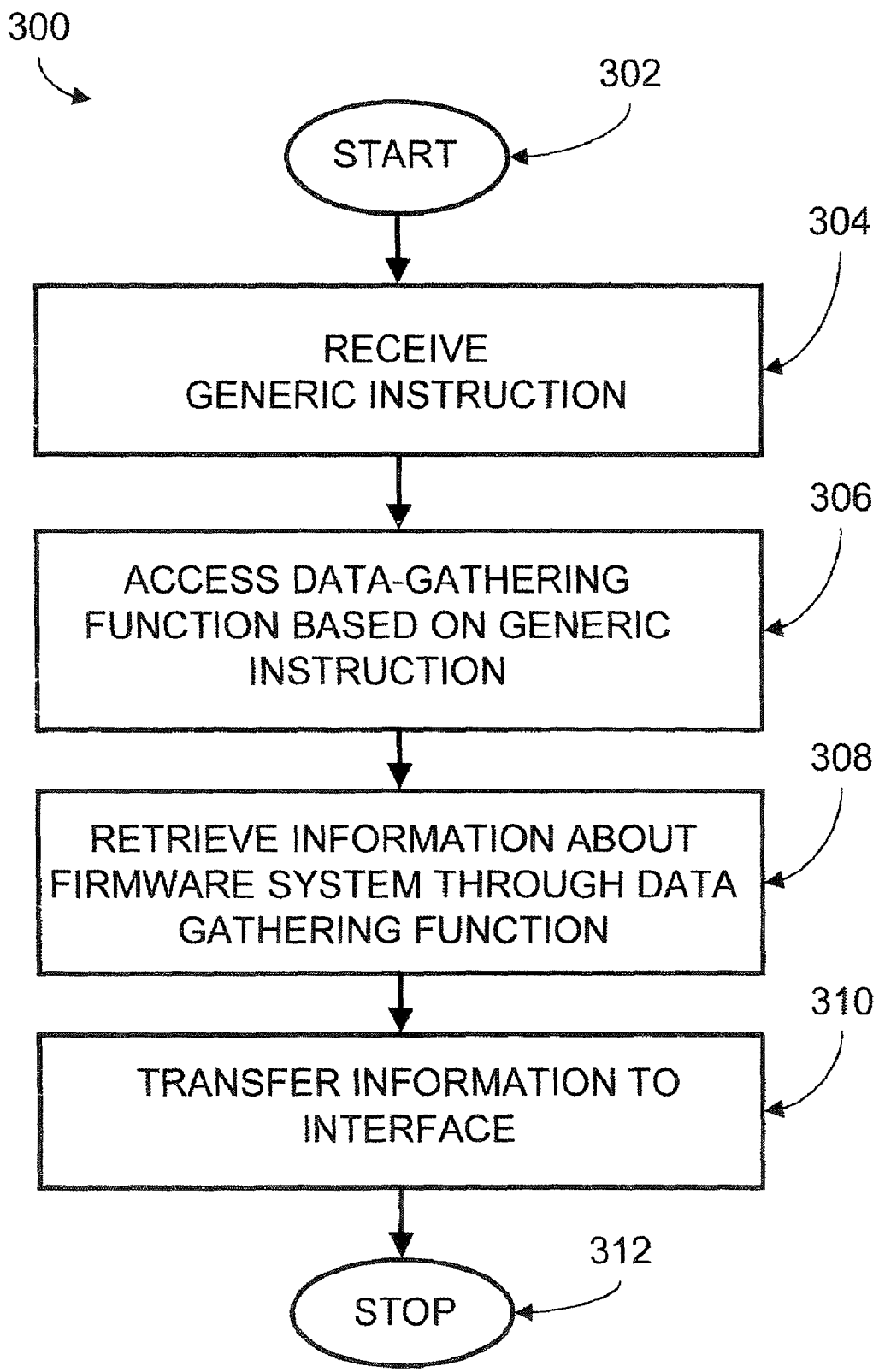
FIG. 3 shows one operation of the detector of FIG. 2, in accord with one embodiment of the invention.

FIG. 3 shows operation 300 for detector 200 of FIG. 2, in accord with one embodiment of the invention. Operation 300 commences in step 302. In one embodiment, operation 300 commences when firmware system 206 of FIG. 2 initializes. Applying power to a computer system where firmware system 206 may reside can initialize firmware system 206. After operation 300 commences, interface 202 of FIG. 2 receives a generic instruction, in step 304. Controller 204 of FIG. 2 then accesses a data-gathering function based on the generic instruction, in step 306. Controller 204 retrieves information about firmware system 206 through the data-gathering function, in step 308. After retrieving the information about firmware system 206, controller 204 transfers the information to interface 202, in step 310.

The generic instruction may be received through the firmware interface, discussed below. An example of the firmware interface is an Extensible Firmware Interface (EFI) system that includes an EFI Boot Manager having an EFI shell developed by Intel Corporation. Firmware system 206 can include a microprocessor, such as an Itanium family microprocessor and/or an IA-32 microprocessor, both from Intel Corporation. Firmware system 206 can also include a firmware instruction set such as a basic input/output system (BIOS) developed by Phoenix Technologies Ltd.

Figure 4:
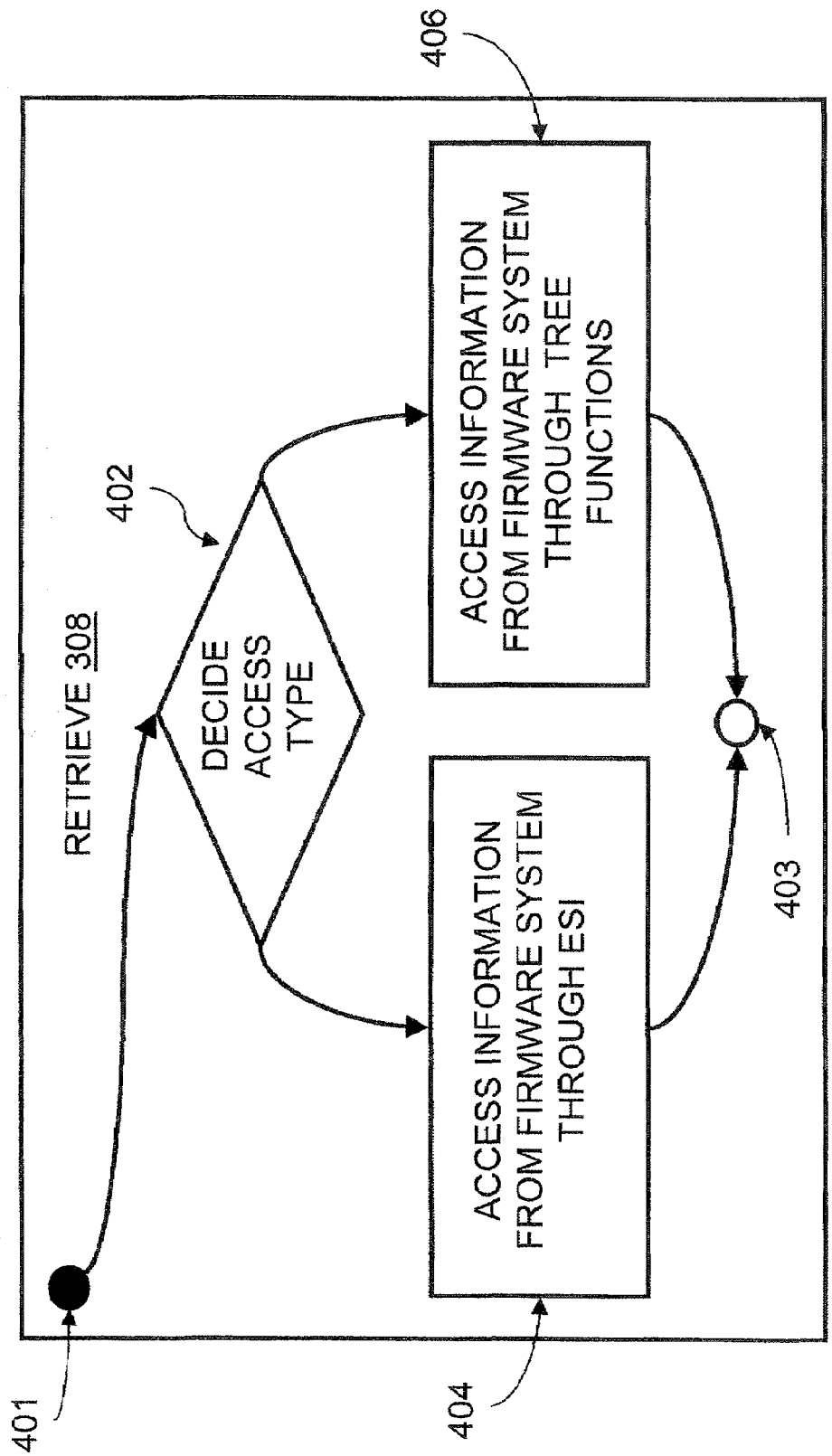
FIG. 4 shows a step of the operation of FIG. 3, in accord with one embodiment of the invention.

FIG. 4 shows retrieve step 308 within operation 300 of FIG. 3, in accord with one embodiment of the invention. Retrieve step 308 enters through entry point 401. A decision is made in decision block 402 based on a type of desired access to firmware system 206 of FIG. 2. Access can be made to firmware system 206 through an Extended System Abstraction Layer Interface (ESI) in step 404 or through tree function calls in step 406. Retrieve step 308 exits through exit point 403.

A tree function can include a method of searching for functions located at memory locations. As an example, a "tree" includes a root, which is analogous to a memory location. The root can include an address of a function in memory. The root typically has branches that extend to other memory locations and may be linked through pointers. Each branch has an end point, or vertex, which can be a root for another branch. A pointer is typically a variable that is analogous to a message that "points" to a memory location. Locating functions, in accordance with one embodiment of the invention, becomes a matter of moving the pointer along the branches of the tree. Similarly, the root, as well as other roots resulting from the branches, can have memory addresses for hardware devices that are either apart of, or interact with, firmware system 206. Gathering information about the hardware devices, in accordance with one embodiment of the invention, becomes a matter of traversing the tree to reveal information about the hardware devices.

Accessing firmware system 206 through the ESI may be performed in a different manner. The ESI can include a traversal algorithm such as a tree function, but the ESI can also operate to make such an algorithm transparent to a user. The ESI of one embodiment, therefore, behaves as an access interface to firmware system 206, using higher-level instructions than the tree functions, but still capable of implementing a traversal algorithm.

Steps 404 and 406 access firmware system 206 in different ways to gather information about firmware system 206. In certain embodiments, each step, 404 and 406, is specifically designed for a unique firmware system. Each step, 404 and 406, may also be implemented as software that functions as a driver for a particular firmware system. For example, step 404 may be implemented as a software driver for one firmware system, while step 406 may be implemented as a software driver for a different firmware system.

The operation of detector 200 of FIG. 2 described in FIGS. 3 and 4 can be implemented by instructions that are stored on storage media. The instructions can be retrieved and executed by a processor. By way of an example, instructions may be software, program code, and firmware; storage media may be memory devices, tapes, disks, integrated circuits, and servers.

Advantages to software implementations of steps 404 and 406 include an abstraction of information gathering methods from the EFI Boot Manager. The abstraction of the information gathering methods enables the EFI to operate independently of firmware system 206. Information gathering software can be developed for each unique version of firmware system 206. Since the information gathering is decoupled from the EFI Boot Manager, the EFI Boot Manager and the EFI can be ported across different firmware platforms.

Figure 5:
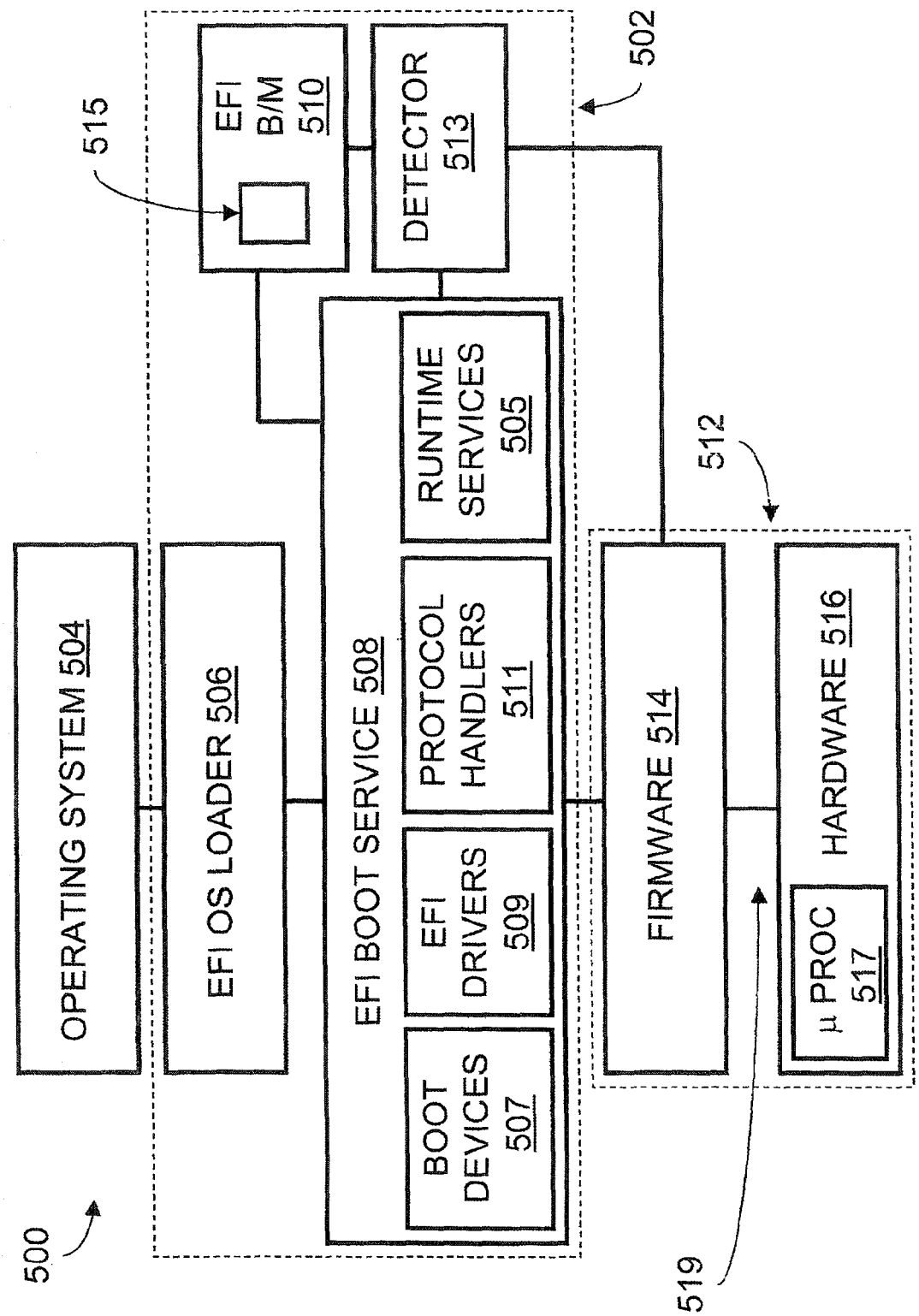
FIG. 5 shows a detector embodied in an EFI of a software architecture for a computing system, in accord with one embodiment of the invention.

FIG. 5 shows detector 513 embodied in EFI 502 of a software architecture for computing system 500, in accord with one embodiment of the invention. EFI 502 is communicatively connected to operating system 504. An example of operating system 504 is Windows produced by Microsoft Corporation. Another example of operating system 504 is Linux created by Linus Torvalds. EFI 502 also communicatively connects to firmware system 512. Firmware system 512 includes firmware instruction set 514 that is typically stored in a read only memory device. Firmware system 512 also includes hardware 516, which typically includes microprocessor 517 that accesses the read only memory device to process firmware instruction set 514. Examples of the microprocessor include an Itanium family microprocessor and an IA-32 microprocessor both from Intel Corporation. Examples of firmware instruction set 514 include a basic input/output system (BIOS) produced by Phoenix Technologies Ltd. Microprocessor 517 may access firmware 514 through a communication bus, such as communication bus 519.

EFI 502 includes EFI operating system loader 506, which serves to load and start operating system 504. EFI 502 also includes a variety of service functions in EFI boot service 508; the services, may for example, include runtime services 505, boot devices 507, EFI drivers 509, and protocol handlers 511. These service functions, 505, 507, 509, and 511, start, commonly referred to as "booting" and "handshaking", associated hardware devices when computer system 500 is initialized. EFI 502 also includes EFI Boot Manager 510 and detector 513. EFI Boot Manager 510 is communicatively connected to detector 513 and to EFI boot service 508. EFI Boot Manager 510 is communicatively connected to EFI boot service 508 and to firmware system 512 through detector 513. A user may interact with firmware system 512 through detector 513. EFI Boot Manager 510 may include EFI shell 515.

Detector 513 detects information about firmware system 512 by receiving a generic instruction from EFI Boot Manager 510. The generic instruction may be received from EFI shell 515. Detector 513 then gathers information about firmware system 512 by accessing a data-gathering function based on the generic instruction. Detector 513 then retrieves information about firmware system 512 through the data-gathering function. Detector 513 then transfers the information to EFI Boot Manager 510. Detector 513 may transfer the information to EFI shell 515. Detector 513 may, thus, operate as an abstracted data gathering system of EFI 502. In another embodiment of the invention, detector 513 may be implemented within runtime services 505, boot devices 507, EFI drivers 509, and/or protocol handlers 511.

Advantages to the embodiment described above enable firmware developers to develop and implement software tools through the EFI Boot Manager that are portable across different firmware platforms, since EFI 502 including EFI Boot Manager 510 and EFI shell 515 can be ported across different firmware platforms. Having EFI 502 be portable is advantageous since software interfaces between firmware systems, such as firmware system 512, do not have to be redeveloped. Other advantages include having a set of pre-compiled information gathering functions that are available when a firmware platform is initialized. Moreover, potential software defects of the information gathering functions can be easily corrected and new features for the information gathering function can be easily implemented as pre-compiled software, thereby making a re-compilation of EFI 502 unnecessary.

Figure 6:
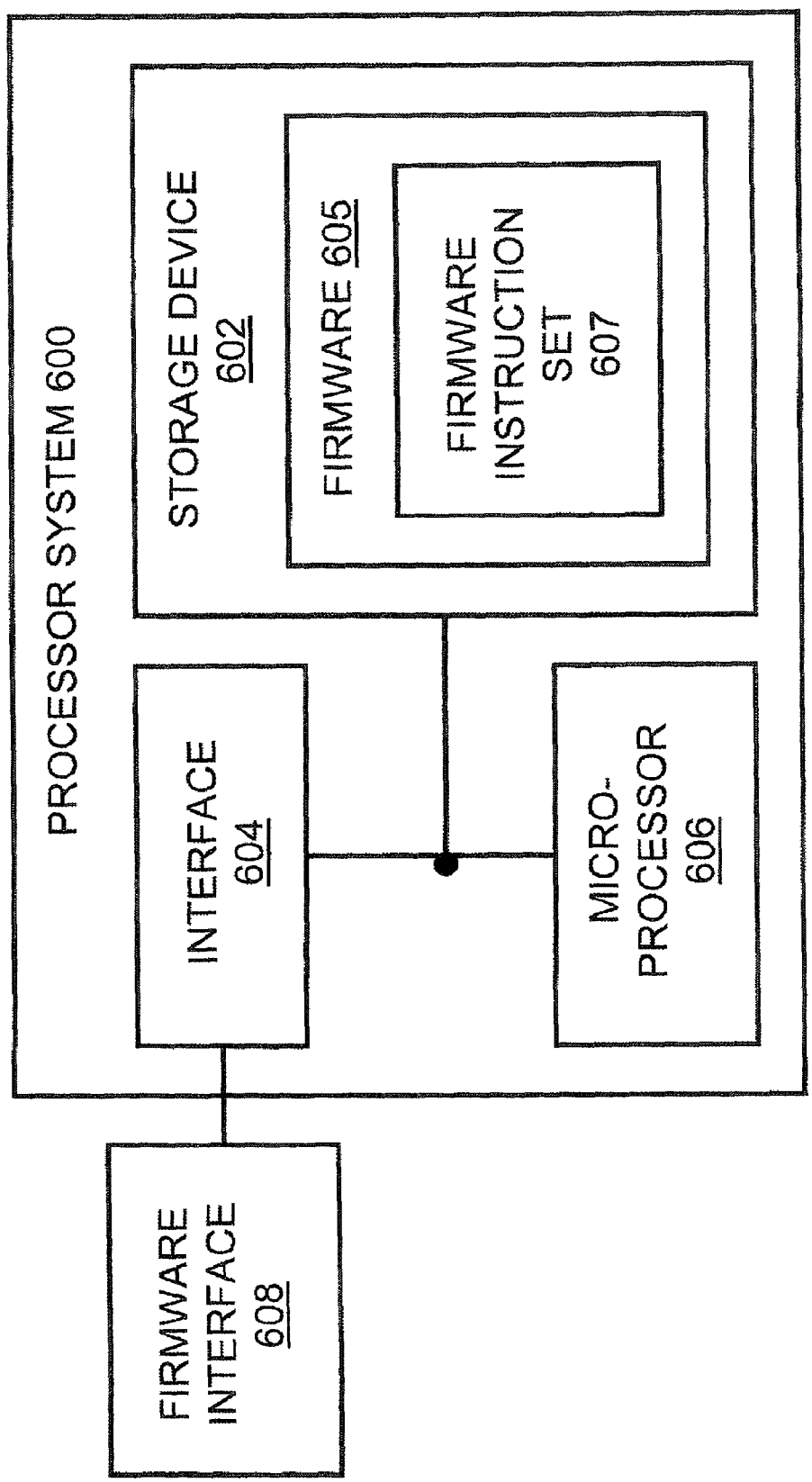
FIG. 6 shows a block diagram of a processor system in accord with one embodiment of the invention.

FIG. 6 shows a block diagram of processor system 600 in accord with one embodiment of the invention. Processor system 600 processes firmware instructions of a firmware platform, such as firmware system 512 of FIG. 5. A generic instruction is input through firmware interface 608 that is communicatively connected to processor system 600. Processor system 600 includes storage device 602, interface device 604, and microprocessor 606. Interface device 604 is communicatively connected to microprocessor 606. Microprocessor 606 is communicatively connected to storage device 602.

Storage device 602 includes a partition for storing firmware 605. Firmware instruction set 607 resides in firmware 605. Storage device 602 may, for example, be read only memory, random access memory, or non-volatile random access memory. Microprocessor 606 may, for example, be an Itanium family microprocessor and/or an IA-32 microprocessor, both from Intel Corporation. Firmware 605 may, for example, be a basic input/output system (BIOS) developed by Phoenix Technologies Ltd.

In operation, interface device 604 receives the generic instruction from firmware interface 608. Microprocessor 606 receives and processes the generic instruction to access a data-gathering function located within firmware instruction set 607. Microprocessor 606 retrieves information about firmware platform 605 through the data-gathering function. Microprocessor 606 transfers the information to firmware interface 608 through interface device 604. In certain embodiments of the invention, the data-gathering function is pre-compiled to operate when firmware platform 605 is initialized. Firmware interface 608 may, for example, be an Extensible Firmware Interface (EFI) shell. The data-gathering function can include a plurality of functions organized into a library and implemented as software drivers. The data-gathering function can retrieve data through tree function calls and/or through an Extended System Abstraction Layer Interface (ESI), as described in retrieve step 308 of FIG. 4.

Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A detector for detecting and providing information about a firmware system to a firmware interface of a computer system, comprising:

a detector interface configured to receive a generic instruction from the firmware interface; and a controller communicatively connected to the detector interface and configured to gather information about and from the firmware system by:

accessing a data-gathering function within the firmware system based upon the generic instruction, retrieving information about the firmware system through the data-gathering function, and transferring the information to the firmware interface via the detector interface.

2. A detector of claim 1, wherein the controller is further configured to gather information about the firmware system in response to an initialization of the firmware system.

3. A detector of claim 1, wherein the firmware interface comprises an Extensible Firmware Interface (EFI) configured for transferring the generic instruction to the interface.

4. A detector of claim 1, wherein the firmware system comprises an Itanium microprocessor.

5. A detector of claim 1, wherein the firmware system comprises an IA-32 microprocessor.

6. A detector of claim 1, wherein retrieving information comprises accessing information from the firmware system through a tree function.

7. A detector of claim 1, wherein retrieving information comprises accessing information from the firmware system through an Extended System Abstraction Layer Interface (ESI).

8. A processor system for processing firmware instructions of a firmware platform selected through a firmware interface by way of a generic instruction, comprising:

a storage device configured for storing the firmware instructions;

an interface device configured to transfer the generic instruction; and a microprocessor, connected to the storage device and to the interface device, configured to receive and process the generic instruction to access a data-gathering function within the firmware instructions, retrieve information about the firmware platform through the data-gathering function, and transfer the information to the firmware interface.

9. A processor system of claim 8, the data-gathering function being pre-compiled to operate when the firmware platform is initialized.

10. A processor system of claim 8, wherein the firmware interface is an Extensible Firmware Interface (EFI).

11. A processor system of claim 8, wherein the microprocessor comprises an Itanium microprocessor.

12. A processor system of claim 8, wherein the microprocessor comprises an IA-32 microprocessor.

13. A processor system of claim 8, the microprocessor retrieving the information about the firmware platform through a tree function.

14. A processor system of claim 8, the microprocessor retrieving the information about the firmware platform through an Extended System Abstraction Layer Interface (ESI).

15. A method of collecting data of and from a firmware platform through a firmware interface, comprising steps of:

accessing a platform-specific data-gathering function within the firmware platform with a generic data-gathering function through the firmware interface;

retrieving information of and from the firmware platform through the platform-specific data-gathering function; and transferring the information from the firmware platform to the firmware interface by way of the generic data-gathering function.

16. A method of claim 15 further comprising a step of pre-compiling the platform-specific data-gathering function to operate in response to an initialization of the firmware system.

17. A method of claim 15, wherein the firmware interface is an Extensible Firmware Interface (EFI).

18. A method of claim 15, wherein the step of retrieving information comprises accessing information from the firmware platform through a tree function.

19. A method of claim 15, wherein the step of retrieving information comprises accessing information from the firmware platform through an Extended System Abstraction Layer Interface (ESI).

* * * * *